(12) United States Patent
Ramesh et al.

(10) Patent No.: US 9,673,632 B1
(45) Date of Patent: Jun. 6, 2017

(54) FLUID PLANE IN COMPUTER DATA CENTER

(71) Applicant: Google Inc., Mountain View, CA (US)

(72) Inventors: Anand Ramesh, Sunnyvale, CA (US); Jimmy Clidaras, Los Altos, CA (US)

(73) Assignee: Google Inc., Mountain View, CA (US)

( * ) Notice: Subject to any disclaimer, the term of this patent is extended or adjusted under 35 U.S.C. 154(b) by 881 days.

(21) Appl. No.: 14/040,343

(22) Filed: Sep. 27, 2013

Related U.S. Application Data

(60) Provisional application No. 61/706,762, filed on Sep. 27, 2012.

(51) Int. Cl.
H02J 1/10 (2006.01)
H02J 4/00 (2006.01)
H02J 9/06 (2006.01)
G06F 1/26 (2006.01)

(52) U.S. Cl.
CPC ............ H02J 4/00 (2013.01); G06F 1/26 (2013.01); H02J 9/061 (2013.01)

(58) Field of Classification Search
CPC .................. H02J 9/061; G06F 1/26
See application file for complete search history.

(56) References Cited

U.S. PATENT DOCUMENTS

| 8,522,569 | B2 | 9/2013 | Avery et al. | |
| 2011/0156480 | A1 | 6/2011 | Park | |
| 2012/0267952 | A1* | 10/2012 | Ballatine | H02J 1/102 307/26 |
| 2012/0326504 | A1* | 12/2012 | Ballantine | H02J 3/006 307/24 |
| 2013/0163192 | A1 | 6/2013 | Ballantine et al. | |
| 2013/0163193 | A1 | 6/2013 | Ballantine et al. | |
| 2013/0328395 | A1* | 12/2013 | Krizman | H02J 4/00 307/18 |

FOREIGN PATENT DOCUMENTS

| EP | 2323235 | 5/2011 |
| EP | 2440028 | 3/2012 |
| WO | 2008/077028 | 6/2008 |
| WO | 2009/012451 | 1/2009 |
| WO | 2009/137070 | 11/2009 |
| WO | 2010/093549 | 8/2010 |
| WO | 2010/151248 | 12/2010 |
| WO | 2011/081850 | 7/2011 |
| WO | 2011/156480 | 12/2011 |

* cited by examiner

Primary Examiner — Daniel Cavallari
(74) Attorney, Agent, or Firm — Fish & Richardson P.C.

(57) ABSTRACT

A method for providing power to a computer data center includes distributing a fluid through a single common domain throughout the computer data center building; converting the fluid into electrical energy at a plurality of electric power generation units that are distributed through the computer data center and connected to receive fluid from the common domain; and providing electrical power from the plurality of power generation units to corresponding electrical loads distributed throughout the computer data center building.

26 Claims, 4 Drawing Sheets

FLUID PLANE IN COMPUTER DATA CENTER

CROSS-REFERENCE TO RELATED APPLICATIONS

This application claims priority to U.S. Provisional Application Ser. No. 61/706,762, filed on Sep. 27, 2012, entitled "Fluid Plane in Computer Data Center," the entire contents of which are hereby incorporated by reference.

TECHNICAL FIELD

This document relates to fluid-based power systems for computer data centers.

BACKGROUND

Computer data centers concentrate a massive amount of computing power in a small number of locationally-related buildings (e.g., on a single site)—generally very large warehouses filled with many rows of computer servers mounted in racks (with thousands, tens of thousands, or hundreds of thousands of computer motherboards or computer cores). Such computers can be networked together and to the Internet to receive, process, and respond to requests from other devices connected to the Internet or other networks. For example, a computer data center may house server systems that respond to search requests, that provide email and similar services that stream music to registered users, and the like. Computer data centers may also be deployed in other contexts. Financial institutions, for example, may employ one or more computer data centers to store financial account and transaction information or to carry out trades with electronic markets.

The massive computing needs of a computer data center can lead to massive electric power requirements. For example, modern large computer data centers can demand tens of megawatts of electricity when operating, or even more. The cost of obtaining such large amounts of electricity can be very high, and the equipment needed to distribute the electricity to computer systems in the computer data center can be expensive and complex.

SUMMARY

This document describes systems and techniques that may be used to provide electric power to computer systems in a computer data center. As discussed herein, a computer data center is a large facility (having thousands of computer servers or more, and associated hardware and support systems, such as electrical power and mechanical (e.g., HVAC) systems) in which a substantial majority of the computing resources are operated by or on behalf of a common entity—as distinguished from a co-location facility in which many organizations may share a facility but operate their own distinct computing hardware.

The techniques discussed here involve distributing power through a data center via a common power plane that carries a fluid, such as natural gas, steam, or diesel oil. The fluid is delivered to a large number of electrical power generation units that are distributed through the data center. These electrical power generation units may then convert the fluid into electrical power and deliver that electrical power—generally at low voltage—to the computer servers and other electrical loads in the data center. For example, the fluid can include natural gas, diesel oil, or steam, and the generation units may include fuel cells, reciprocating engines, or microturbines. The generation units may be located, for example, at the row or sub-row level in the data center. For example, a fuel cell may be placed at the end of a row of racks or a pair of rows that are positioned back-to-back via warm air capture plenum, and may provide electricity to the each of the computers in the row or rows. In some embodiments, the units may be in a different area from the servers or outside of the data center but aligned with the rows they serve, e.g., so that wiring or a bus bar may connect each of them directly to the corresponding row they serve, with power taps being fed to individual racks. The units may also be mounted to particular racks, such as with a unit mounted to the top of each rack or the side of each rack, and power cords leading from the unit to particular motherboards or other components in the corresponding rack (though perhaps passing through associated power supplies first).

A domain as described here is an area in which electricity or a fluid can flow freely, without being blocked by active components such as transformers, closed (i.e., non-communicating) switches/valves, or other components that would prevent electric current or fluid, as the case may be, from flowing from a first area in the domain to a second area in the domain where the current or fluid is presently needed. For example, a single joined conductor (either electric conductor or open fluid conduit) of adequate capacity to handle expected current/fluid flow over and across a domain (perhaps including closed switches, or open valves), and having a single common voltage or pressure (though with expected minor spatial and transient variation in voltage or pressure across the domain) can be considered a common domain.

The respective low voltage domains served by the large common domain may be many in number and relatively small in size. For example, the average low voltage domain may cover a single-digit number of racks of computers (1 to 9) and fewer than 100 or fewer than 200 discrete motherboards of computers. For example, a power generation unit may be mounted at the top of each rack or each bay in each row of racks in a data center, or above every nth rack, where each generation unit would then serve n racks (where n is an integer of value 1 or more). (A rack may be an individually movable collection of computer systems, and may include one or more vertical stacks, or bays, of computer server systems, such as 30 different computer motherboards that lay horizontally on trays that rest on shelves from a level near the floor to a level of about six feet to ten feet off the floor.) Such low voltage power may be carried from each generation unit to a corresponding power strip that runs vertically along a front corner of the corresponding rack. The strip may include female outlets into which may be plugged cords that server particular ones of the computers in the rack.

In one implementation, a method for providing power to a computer data center is disclosed. The method comprises distributing a fluid through a single common domain throughout the computer data center building; converting the fluid into electrical energy at a plurality of electric power generation units that are distributed through the computer data center and connected to receive fluid from the common domain; and providing electrical power from the plurality of power generation units to corresponding electrical loads distributed throughout the computer data center building. The fluid may be selected form the group consisting of natural gas, diesel oil, and steam, and particularly may comprise natural gas. The electric power generation units can be selected from the group consisting of fuel cells, reciprocating engines, and microturbines, and particularly can comprise fuel cells.

In some aspects, the single common domain serves a majority of the electric loads in the data center building. Also, all the electric loads in the data center building may together exceed 50 megawatts. In addition, the single common domain can serve substantially all of the electric loads in the data center building, and all the electric loads in the data center building can together exceed 50 megawatts. Also, the single common domain can be defined as a zone in which the fluid can flow freely throughout the single common domain without substantial blockage in movement. Moreover, the electric power generation units may be configured to produce low voltage power below 600 volts.

In yet other aspects, the electric loads comprise a plurality of racks of computer servers that receive electric power from corresponding ones of the electric power generation units. Also, the method can further include communicating over a network between a central control system and the electric power generation units to identify and coordinate electric usage by loads served by respective electric power generation units.

In another implementation, a system for providing power to a computer data center is disclosed. The system comprises a fluid conduit defining a common fluid domain in a data center building; a plurality of electric power generation units distributed through the computer data center building and connected to receive fluid from the common fluid domain; and a plurality of electric loads distributed through the data center building, wherein particular groups of the plurality of electric loads are connected to receive electric power from corresponding ones of the electric power generation units. The system can also comprise a fluid in the fluid conduit selected form the group consisting of natural gas, diesel oil, and steam.

Moreover, the system can include a fluid in the fluid conduit that includes natural gas. The electric power generation units, in certain aspects, are selected from the group consisting of fuel cells, reciprocating engines, and microturbines, and can particularly comprise fuel cells. The common domain can serve a majority of the electric loads in the data center building, including where all the electric loads in the data center building together exceed 50 megawatts. Similarly, the common domain can serve substantially all of the electric loads in the data center building, including where all the electric loads in the data center building together exceed 50 megawatts.

The common domain can be defined as a zone in which the fluid can flow freely throughout the single common domain without substantial blockage in movement. Also, in certain aspects, the electric power generation units produce low voltage power below 600 volts. Moreover, the electric loads can comprise a plurality of racks of computer servers that receive electric power from corresponding ones of the electric power generation units. In addition, the system can also include a network arranged to carry data communications between a central control system and the electric power generation units to identify and coordinate electric usage by loads served by respective electric power generation units.

Other features and advantages will be apparent from the description and drawings, and from the claims.

DETAILED DESCRIPTION

This description discusses systems and techniques for distributing power in a computer data center, including where the power is held in a fluid that is distributed through the data center facility. In general, the fluid may enter the computer data center facility from a utility (e.g., a gas or steam supplier), and may be routed to areas spaced apart in the facility where electric generation units are located. Such units may generally generate low voltage power (e.g., 480 volts, 240 volts, or 120 volts), though they could also generate medium voltage power. For example, a generation unit may be positioned at the end of each row or pair of rows of racks, or may be mounted to each nth rack, where n is an integer equal to or greater than 1.

Figure 1A:
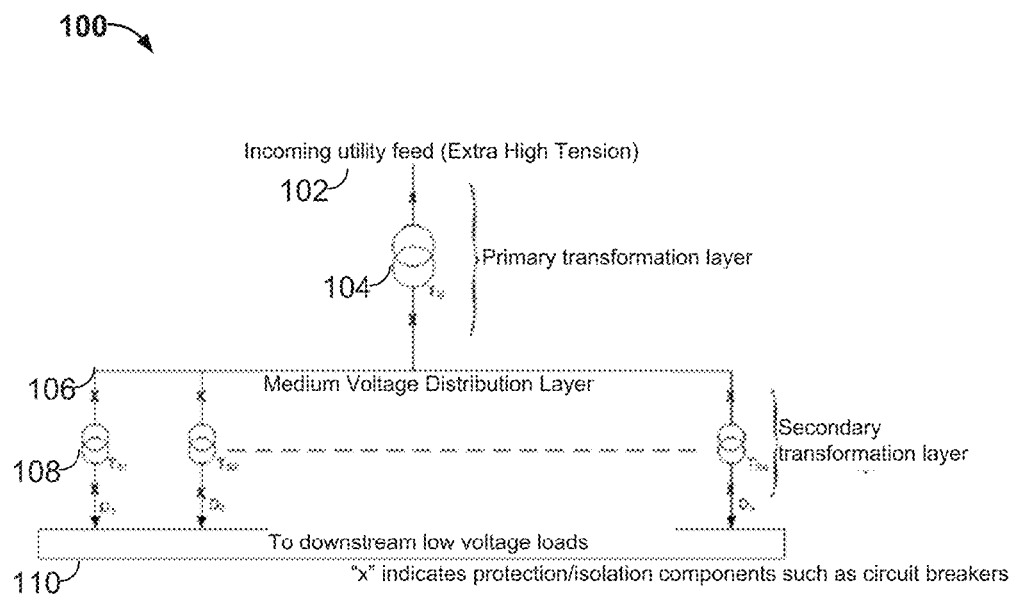
FIG. 1A is a schematic diagram of an all-electric distribution system in a computer data center.

FIG. 1A is a schematic diagram of an all-electric distribution system in a computer data center. This figure shows a large-scale electrical distribution system 100. High voltage electric service may enter by utility feed 102 and be stepped down to medium-voltage at primary transformation layer 104, such as at a sub-station or similar structure.

The electric power may then be distributed, such as across a data center campus and/or inside a data center building by a medium voltage distribution layer 106, which may be made up of a plurality of electric busses that are connected to form a single large medium voltage domain in a data center. As a single domain, the power can flow freely from one point in the domain to any other point in the domain (e.g., without requiring conversion).

A secondary transformation layer 108 may step the power from medium voltage to low voltage power. For example, a large number of medium voltage-to-low voltage transformers (for AC power) or other converters may be provided at the row level in a datacenter, such as individual transformers at the end of a row or pair of rows, or above or mounted to particular racks that they serve with electric power.

Finally, a low voltage layer 110, which may be made up of a large number of separate low voltage domains, may serve a large number of electric loads, such as computer servers, networking equipment, and the like. The layer 110 may include power supplies that correspond to and serve particular servers, and which may further step the power down, such as to single-digit voltage levels, and may also convert the power to DC power in certain implementations.

Figure 1B:
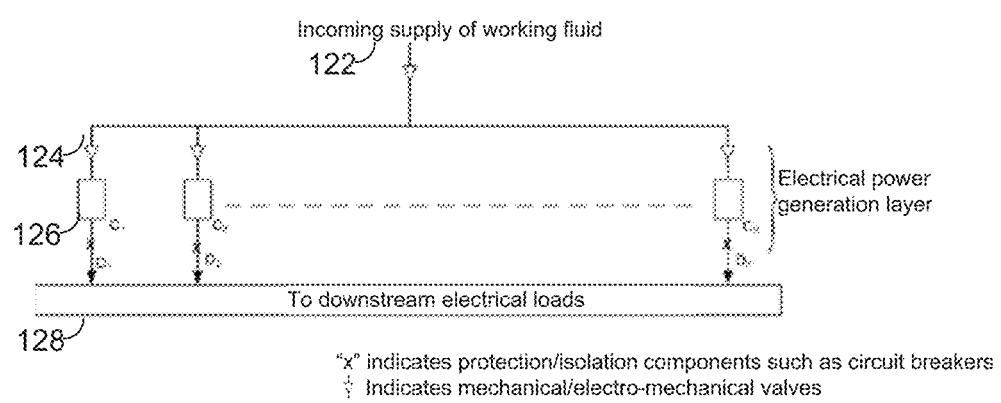
FIG. 1B is a schematic diagram of fluid-based power distribution system in a computer data center.

FIG. 1B is a schematic diagram of fluid-based power distribution system 120 in a computer data center. The system is somewhat similar to the system 100 of FIG. 1A, but the medium voltage electric domain is replaced with a fluid-based domain. The fluid can be a variety of types of fluid, including natural gas, steam, and diesel oil. Such fluid may be provided, for example, by a utility (e.g., the gas company, in colloquial terms). The pressure of the fluid may be stepped down when it enters a data center site, similar to the manner than the voltage of the electricity in the system 100 of FIG. 1A is stepped down. A network of fluid conduits may be arranged in the data center facility and may terminate at generation units that are distributed throughout the facility. The fluid may thus flow relatively freely within the conduit to any of the generation units within a fluid domain 124.

Figure 2:
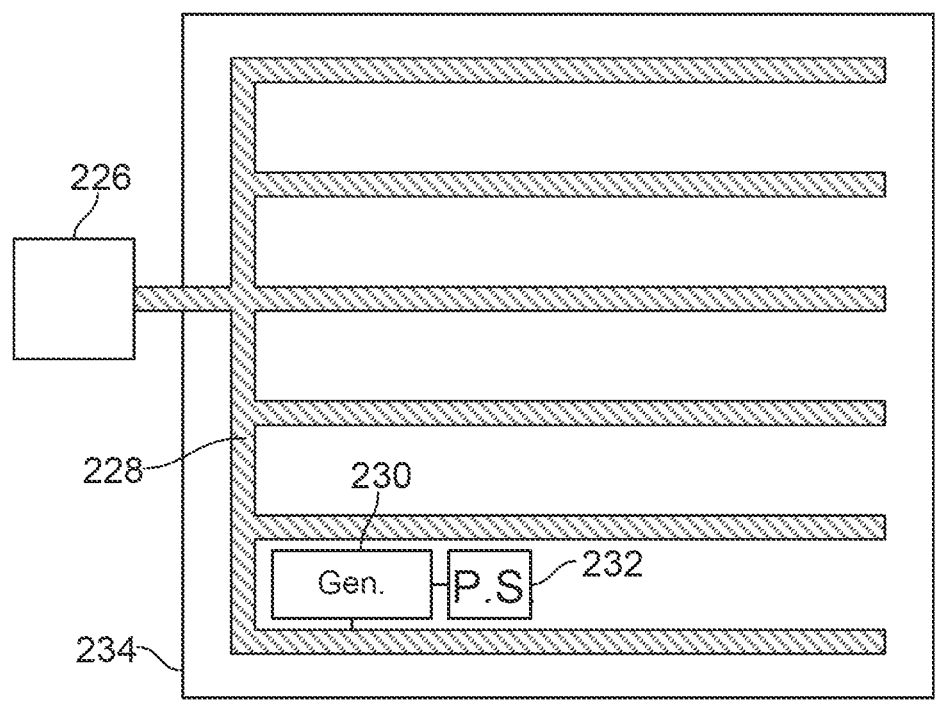
FIG. 2 is a schematic diagram showing a power distribution system in relation to rows of racks in a computer data center.

The generation units, such as example unit 126, may be located throughout the facility, and may provide electric power at their outputs to an electric load layer 128 made up of a large number of separate low voltage domains. For example, the generation units may include fuel cells that are located at floor-level at the end of particular rows of racks and may serve the computers that they are most proximate to. The generation units may also be mounted overhead, particularly when the generation units are relatively small, such as when the generation units serve a single rack or a small number of racks (e.g., two, three, or other single-digit number of racks). While input to a generation unit may be via fluid conduit (either solid, e.g., metal piping, or flexible (e.g., flexible gas line)), output may be via electrical conductor. The conductor may be flexible, such as via a commonly understood power cord or multiple powers cords. The cords may then lead to further power distribution structures that split into additional conductors (where each cord or conductor may include multiple sub-conductors for distribution of AC power, for example). The spacing of the generation units may be in a substantially-equally spaced linear or x-y grid arrangement across a substantial portion of the data center computing space. For example, FIG. 2 is a schematic diagram showing a power distribution system in relation to rows of racks in a computer data center. This example shows a data center facility 120 that receives a fluid from a utility service 226 and provides the fluid to the facility 234.

The data center has six rows of conduits in this example, and the lowest pictured conduit is shown connected to a generation unit 230, which serves a power supply 232 with electricity. The unit 230 may include, for example, a microturbine or fuel cell as discussed above and below. The unit 230 and power supply 232 are exemplary, and in an implementation would be repeated dozens or hundreds or thousands of times through the data center facility 232, generally in an x-y grid where the spacing is generally consistent in the x dimension and generally consistent in the y dimension so that the units 230 are in a grid. The unit 230 may, for example, be repeated for each rack in each row, in each bay in each rack, or in each nth rack or nth bay (or each nth rack of each mth bay). Again, the row may include dozens of bays along its length and the particular conduit may serve two rows of racks that are in a back-to-back paired-row configuration. The conduit may extend down the middle of such paired row (e.g., above or in a warm air plenum, or above a human-occupied aisle), so that taps extending from on one side of the conduit serve computer systems in a first row of the paired rows, and taps extending from the other side of the conduit serve computer systems in the second row of the paired rows. The unit 130 in this example could, for example, serve low voltage power to all of the computer motherboards in a particular bay of the row of racks or in to all of the computers in a rack that has multiple bays. Where the unit 130 serves a single bay, that bay may include, for example, approximately 30 distinct motherboards that are mounted on shelves (and on trays) in the bay. Each such motherboard may be connected to its own power supply 132, so that generating unit 130 will provide electrical output for 30 different power supplies like power supply 132. Alternatively, each power supply like power supply 132 could serve three different computer systems, so that the generating unit 130 would serve 10 different power supplies that each serve three motherboards.

In certain implementations, each generating unit may serve an entire row or a pair of rows of racks, such as by serving approximately 400, 500, or 600 KW of power. In such situations, the respective unit 130 may be located at floor level and at the end of a row or rows (e.g., two back-to-back rows that share a common warm-air plenum) of racks, with low voltage conduits running down along the respective rows to serve particular racks and particular servers or groups of servers.

Figure 3:
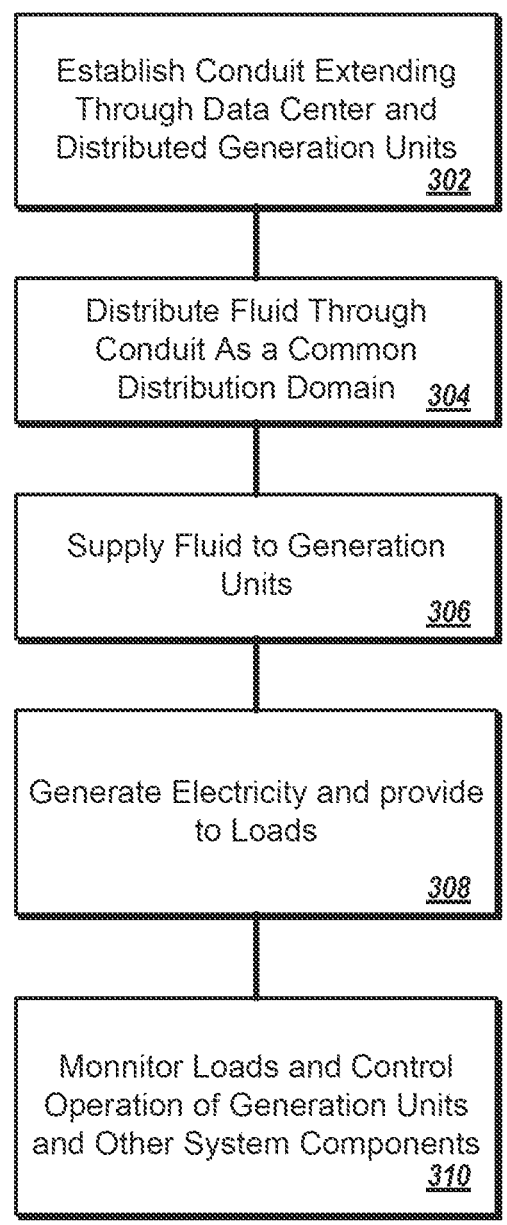
FIG. 3 is a flow chart of an example process for distributing power in a computer data center using a large fluid domain.

Referring more generally to FIG. 2 then, the fluid domain and conduit 228 is relatively large in terms of the number of MW of power it can deliver, such as 10, 20, 30, 50 or more MW. Similarly, the low-voltage domain in FIG. 2, which covers up to several dozen power supplies, is significantly smaller than the fluid domain, such that, for example, the fluid domain could serve more than 100, 500, 1000, or 5000 generating units. For example, each fluid domain may serve more than 100, 500, 1000, 5000, or 10000 motherboards, and up to 1,000,000 motherboards. Particular size and ratios of liquid domains to low voltage domains may be selected to FIG. 3 is a flow chart of an example process for distributing power in a computer data center using a large fluid domain. In general, the process involves distributing an energy-carrying fluid within or near a data center facility, and using the fluid to generate electric power at a large number of locations spread throughout the inside or around a portion of a perimeter of the facility so that such electricity can be provided to computing systems and related components in the facility.

The process begins at box 302, where a conduit is established in or adjacent a data center facility in proximity to electric generation units for serving the facility. For example, a branched arranged of conduits may be provided in a familiar manner, and may be spread out throughout the inside area of the facility. Such conduits may be rigid metal piping, flexible piping, or a combination of the two set out to form a distribution network in the facility.

At box 304, fluid is distributed through the conduit, where the conduit is treated as a single distribution domain. In particular, all areas of the conduit may be generally open to all other areas so that the fluid may flow readily through the conduit to where it is needed. Such fluid may be provided, for example, via taps to electric generation units (box 306), which may in turn generate electricity from the fluid, where the electricity can be provided to electric loads, such as servers and networking equipment, in the facility (box 308). In some examples, steam may be the fluid and may be used to spin microturbines that generate low voltage electricity. The condensate from the steam may then be readily removed and drained from inside the facility. Similarly, natural gas or other such fuel sources, and fuel cells may be used, and any precipitate or other formed residuals may be drained or vented away from the generation units. The common domain here may span a substantial portion of the data center, such as 25%, 50%, 75%, or 100% of the data center.

At box 310, the loads are monitored and operation of the loads and the power generation equipment may be adjusted accordingly. For example, if a bank of servers has just been assigned a project, they or a system managing their computing workload may notify the generation unit serving them, either directly or through the power supplies that serve the servers, and that may have an ability to communicate with whatever component is providing them with electric power. In this manner, the varying needs for electric power in a data center can be quickly addressed, and power may be quickly provided where it is needed.

Figure 4:
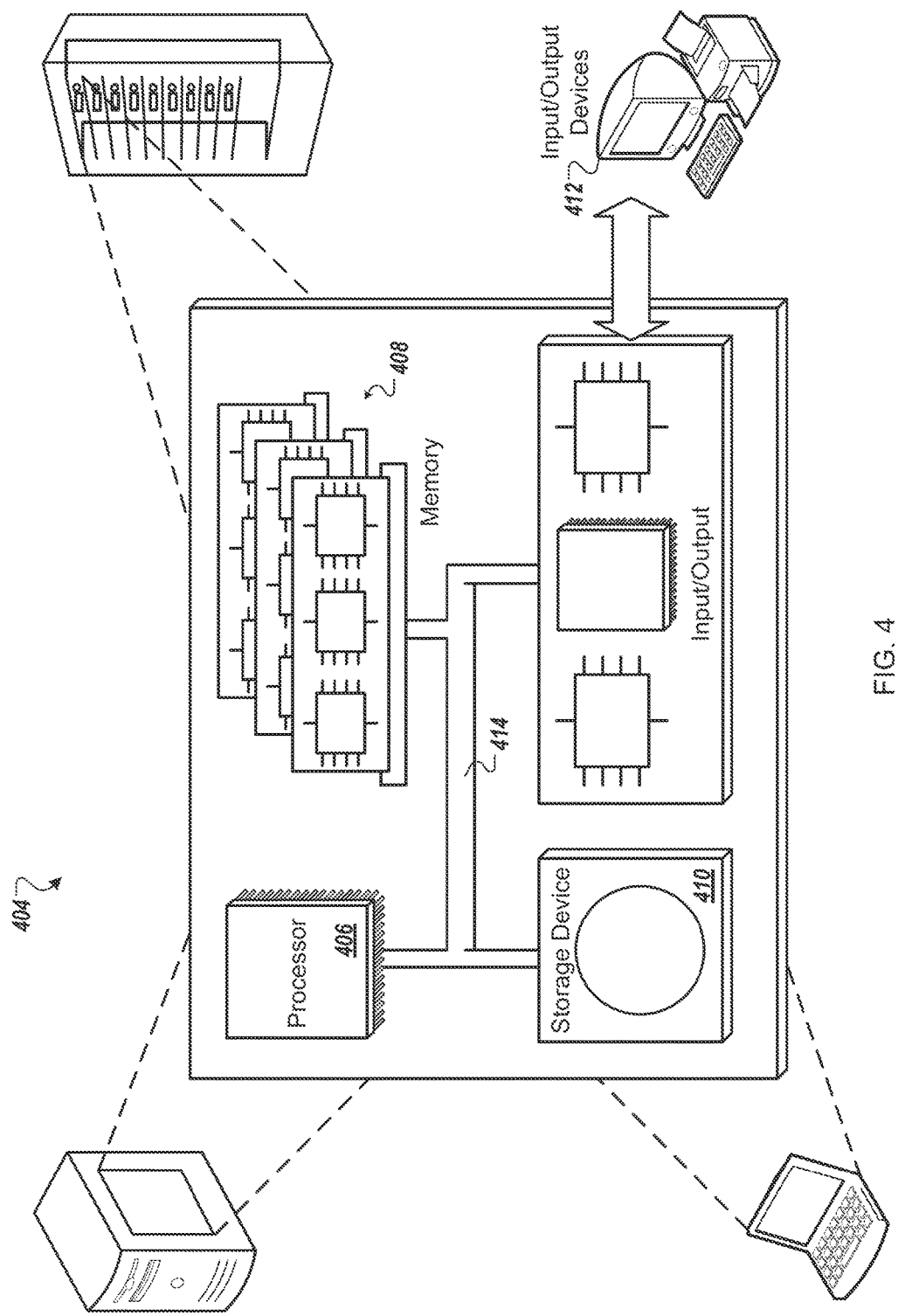
FIG. 4 shows a general computer system that can provide for management and control of electrical energy delivery to a data center.

FIG. 4 shows a general computer system 400 that can provide for management and control of electrical energy delivery to a data center. For example, with respect to the techniques discussed above, the system 400 can be used to operate software executing a control system for coordinating the action of computer servers in a computer data center, power supplies for the computer servers, and power generation units like those discussed above, along with more central components. For example, computer servers may estimate their electrical needs for the near future and may each inform their corresponding power supply (i.e. that power supply that serves them with electricity). The power supplies may in turn communicate with each other over a data network, and/or with a generation unit that serves electricity to them. Such communications may cause the generation unit to "power up" to meet the coming demand, or to ration energy supplied to other computer servers in the domain served by the particular generation unit. In turn, the generation units may communicate to a central control system, such as to have the central control system open or close one or more valves so that an adequate amount of natural gas or other fluid is provided to meet the demand of particular generation units that may be distributed relatively evenly throughout the data center facility. Each of these active communicating components may include computing components like those discussed here for system 400.

The system 400 may, for example, control the switching of power and the delivery through different domains in the system, such as in the manner discussed for FIG. 4 above. The system 400 may exemplify computers located at each power supply in a system, computers that communicate with and control the power used by and the activities of such power supplies, and other computers that communicate via a network, including a central computer system that controls and coordinates power distribution throughout a computer data center facility or facilities and between different computer data center facilities. The system 400 may be implemented in various forms of digital computers, including computerized defibrillators laptops, personal digital assistants, tablets, and other appropriate computers. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having an LCD (liquid crystal display) or LED display for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Many other implementations other than those described may be employed, and may be encompassed by the following claims.

What is claimed is:

1. A method for providing power to a computer data center, the method comprising:
    distributing a fluid through a single common domain throughout a portion of the computer data center building that houses computers for the data center;
    converting the fluid into electrical energy at a plurality of electric power generation units that are distributed through the computer data center and connected to receive fluid from the common domain; and
    providing electrical power from the plurality of power generation units to corresponding electrical loads distributed throughout the computer data center building.

2. The method of claim 1, wherein the fluid is selected form the group consisting of natural gas, diesel oil, and steam.

3. The method of claim 1, wherein the fluid comprises natural gas.

4. The method of claim 1, wherein the electric power generation units are selected from the group consisting of fuel cells, reciprocating engines, and microturbines.

5. The method of claim 1, wherein the electric power generation units comprise fuel cells.

6. The method of claim 1, wherein the single common domain serves a majority of the electric loads in the data center building.

7. The method of claim 6, wherein all the electric loads in the data center building exceed 50 megawatts.

8. The method of claim 1, wherein the single common domain serves substantially all of the electric loads in the data center building.

9. The method of claim 8, wherein all the electric loads in the data center building together exceed 50 megawatts.

10. The method of claim 1, wherein the single common domain comprises a fluid conduit in which the fluid can flow freely throughout the single common domain without substantial blockage in the fluid conduit.

11. The method of claim 1, wherein the electric power generation units produce low voltage power below 600 volts.

12. The method of claim 1, wherein the electric loads comprise a plurality of racks of computer servers that receive electric power from corresponding ones of the electric power generation units.

13. The method of claim 1, further comprising communicating over a network between a central control system and the electric power generation units to identify and coordinate electric usage by loads served by respective electric power generation units.

14. A system for providing power to a computer data center, the method comprising:
    a fluid conduit defining a common fluid domain in a data center building;
    a plurality of electric power generation units distributed through the computer data center building and connected to receive fluid from the common fluid domain; and
    a plurality of electric loads distributed through the data center building, wherein particular groups of the plurality of electric loads are connected to receive electric power from corresponding ones of the electric power generation units.

15. The system of claim 14, further comprising a fluid in the fluid conduit selected form the group consisting of natural gas, diesel oil, and steam.

16. The system of claim 14, further comprising a fluid in the fluid conduit that includes natural gas.

17. The system of claim 14, wherein the electric power generation units are selected from the group consisting of fuel cells, reciprocating engines, and microturbines.

18. The system of claim 14, wherein the electric power generation units comprise fuel cells.

19. The system of claim 14, wherein the common domain serves a majority of the electric loads in the data center building.

20. The method of claim 19, wherein all the electric loads in the data center building together exceed 50 megawatts.

21. The system of claim 14, wherein the common domain serves substantially all of the electric loads in the data center building.

22. The system of claim 21, wherein all the electric loads in the data center building exceed 50 megawatts.

23. The system of claim 14, wherein the common domain comprises a fluid conduit in which the fluid can flow freely throughout the common domain without substantial blockage in the fluid conduit.

24. The system of claim 14, wherein the electric power generation units produce low voltage power below 600 volts.

25. The system of claim 14, wherein the electric loads comprise a plurality of racks of computer servers that receive electric power from corresponding ones of the electric power generation units.

26. The system of claim 14, further comprising a network arranged to carry data communications between a central control system and the electric power generation units to identify and coordinate electric usage by loads served by respective electric power generation units.

* * * * *